(12) United States Patent
Geng et al.

(10) Patent No.: US 11,178,612 B2
(45) Date of Patent: Nov. 16, 2021

(54) COMMUNICATION METHOD, TERMINAL, AND NETWORK DEVICE

(71) Applicant: HUAWEI TECHNOLOGIES CO., LTD., Guangdong (CN)

(72) Inventors: Tingting Geng, Shanghai (CN); Qinghai Zeng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 29 days.

(21) Appl. No.: 16/711,657

(22) Filed: Dec. 12, 2019

(65) Prior Publication Data

US 2020/0120602 A1   Apr. 16, 2020

Related U.S. Application Data

(63) Continuation of application No. PCT/CN2018/089948, filed on Jun. 5, 2018.

(30) Foreign Application Priority Data

Jun. 14, 2017  (CN) .................. 201710446713.4 1

(51) Int. Cl.
*H04W 52/02*  (2009.01)
*H04W 72/04*  (2009.01)
*H04W 72/08*  (2009.01)

(52) U.S. Cl.
CPC ... *H04W 52/0216* (2013.01); *H04W 52/0229* (2013.01); *H04W 72/044* (2013.01); *H04W 72/085* (2013.01)

(58) Field of Classification Search
CPC ......... H04W 52/0216; H04W 52/0229; H04W 72/044; H04W 72/085; H04W 24/02;
(Continued)

(56) References Cited

U.S. PATENT DOCUMENTS

2013/0331081 A1* 12/2013 Rune ................. H04W 52/0229
                                                                455/418
2014/0198681 A1   7/2014 Jung et al.
(Continued)

FOREIGN PATENT DOCUMENTS

CN    103828474 A   5/2014
CN    103875292 A   6/2014
(Continued)

OTHER PUBLICATIONS

Maheshwari, Mukesh Kumar, et al. "Hybrid directional discontinuous reception (HD-DRX) for 5G communication." IEEE Communications Letters 21.6 (2017): 1421-1424. (Year: 2017).*
(Continued)

*Primary Examiner* — Sharad Rampuria
(74) *Attorney, Agent, or Firm* — Womble Bond Dickinson (US) LLP

(57) ABSTRACT

This application provides a communication method, a terminal, and a network device. The communication method includes: performing, by a terminal, signal measurement based on a beam sweeping manner of a cell, to obtain a measurement result; sending, by the terminal, the measurement result to a network device; receiving, by the network device, the measurement result obtained by the terminal by performing signal measurement based on the beam sweeping manner of the cell; and processing, by the network device, the measurement result. The communication method, the terminal, and the network device that are provided in this application help avoid wasting power consumption of the terminal.

17 Claims, 4 Drawing Sheets

(58) Field of Classification Search
CPC . H04W 52/02; H04W 52/0209; H04W 24/00;
Y02D 30/70; H04B 3/46; H04B 17/00;
H04L 43/00; H04L 43/50
See application file for complete search history.

(56) References Cited

U.S. PATENT DOCUMENTS

| | | |
|---|---|---|
| 2015/0358129 A1 | 12/2015 | Ryu et al. |
| 2016/0105791 A1 | 4/2016 | Wang et al. |
| 2017/0054534 A1 | 2/2017 | Sang et al. |

FOREIGN PATENT DOCUMENTS

| | | |
|---|---|---|
| CN | 104469688 A | 3/2015 |
| CN | 104937972 A | 9/2015 |
| CN | 106465148 A | 2/2017 |
| KR | 20160081780 A | 7/2016 |
| WO | 2011014014 A2 | 2/2011 |
| WO | 2015115986 A1 | 8/2015 |
| WO | 2015137656 A1 | 9/2015 |
| WO | 2016172840 A1 | 11/2016 |
| WO | 2017022902 A1 | 2/2017 |

OTHER PUBLICATIONS

Weng, Chung-Wei, et al. "Efficient beam sweeping paging in millimeter wave 5G networks." 2018 IEEE International Conference on Communications Workshops (ICC Workshops). IEEE, 2018. (Year: 2018).*

* cited by examiner

COMMUNICATION METHOD, TERMINAL, AND NETWORK DEVICE

CROSS-REFERENCE TO RELATED APPLICATIONS

This application is a continuation of International Application No. PCT/CN2018/089948, filed on Jun. 5, 2018, which claims priority to Chinese Patent Application No. 201710446713.4, filed on Jun. 14, 2017. The disclosures of the aforementioned applications are hereby incorporated by reference in their entireties.

TECHNICAL FIELD

This application relates to the communications field, and more specifically, to a communication method, a terminal, and a network device.

BACKGROUND

With continuous development of communications technologies, a new radio (NR) communications system, such as a fifth-generation (5G) mobile communications system, may be deployed not only on a low frequency band, such as a frequency band less than 3 GHz (including 3 GHz), but also on a high frequency band, such as a frequency band greater than 6 GHz (including 6 GHz).

An inherent characteristic of a high-frequency signal, such as low penetration force and fast fading of the signal when being blocked, may cause a relatively large path loss of the high-frequency signal. To compensate for a path loss of the high-frequency signal and improve service transmission reliability, usually, a high-frequency system configures a plurality of beams in a cell, and performs beam sweeping to ensure coverage.

In the high-frequency system, a terminal may also perform minimization of drive tests (MDT), to obtain a network-related parameter, to detect a network fault and/or optimize network performance.

However, when measurement is performed by using an existing MDT method, power consumption of the terminal is relatively large.

SUMMARY

This application provides a communication method, a terminal, and a network device, to help avoid wasting power consumption of the terminal.

According to a first aspect, this application provides a communication method. The communication method includes: performing, by a terminal, signal measurement based on a beam sweeping manner of a cell, to obtain a measurement result; and sending, by the terminal, the measurement result to a network device.

In the communication method, the terminal performs signal measurement based on the beam sweeping manner of the cell, so that the terminal can perform signal measurement in a beam sweeping time period of a signal, thereby helping avoid wasting power consumption of the terminal.

With reference to the first aspect, in a first embodiment, the performing, by a terminal, signal measurement based on a beam sweeping manner of a cell, to obtain a measurement result includes: determining, by the terminal, a beam sweeping time period of a first beam in the cell based on the beam sweeping manner of the cell; determining, by the terminal as a target measurement time period based on the beam sweeping time period of the first beam and logging duration, all or a part of a time period that is in the logging duration and that overlaps with the beam sweeping time period of the first beam; and performing, by the terminal, signal measurement in the target measurement time period to obtain the measurement result.

In this implementation, the terminal first determines the beam sweeping time period of the first beam in the cell based on the beam sweeping manner of the cell, and then may perform signal measurement on a first signal on the first beam in the time period that is in the beam sweeping time period of the first beam and that overlaps with the configured logging duration. In this way, the terminal may perform signal measurement on the first signal only in a time period in which the first signal is detected, and may stop signal measurement of the first signal in a time period that is in the beam sweeping time period of the first beam and that does not overlap with the logging duration, thereby avoiding wasting power consumption of the terminal.

With reference to the first embodiment, in a second embodiment, a length of the logging duration is greater than or equal to a length of a beam sweeping cycle of the first beam.

In this implementation, the length of the logging duration is greater than or equal to the length of the beam sweeping cycle of the first beam, to help the terminal detect the first signal in the logging duration. To be specific, in this way, the beam sweeping time period of the first beam has a time period overlapping with the logging duration, to help avoid measurement of the first signal when the terminal cannot detect the first signal, and further help avoid wasting power consumption of the terminal.

With reference to the first embodiment, in a third embodiment, a start moment of the logging duration is equal to a start moment of the beam sweeping time period of the first beam.

In this implementation, the start moment of the logging duration is equal to the start moment of the beam sweeping time period of the first beam, and in this way, the beam sweeping time period of the first beam has a time period overlapping with the logging duration, to help avoid measurement of the first signal when the terminal cannot detect the first signal, and further help avoid wasting power consumption of the terminal.

With reference to any one of the first to the third embodiment, in a fourth embodiment, the logging duration is N times a DRX cycle, and N is a positive number; and the determining, by the terminal as a target measurement time period based on the beam sweeping time period of the first beam and logging duration, all or a part of a time period that is in the logging duration and that overlaps with the beam sweeping time period of the first beam includes: determining, by the terminal as the target measurement time period based on the beam sweeping time period of the first beam, the DRX cycle, and a DRX ON time period in the DRX cycle, all or a part of a time period that is in the DRX ON time period and that overlaps with the beam sweeping time period of the first beam.

In this implementation, the terminal determines, as the target measurement time period, all or a part of the time period that is in the beam sweeping time period of the first beam and that overlaps with the DRX ON time period. The DRX ON time period is a time period in which the terminal receives data. Therefore, this helps prevent the terminal from performing signal measurement in a DRX OFF time period, and further helps avoid wasting power consumption of the terminal.

The DRX ON time period may be an integer multiple of the beam sweeping time period of the first beam.

With reference to any one of the first aspect or the foregoing embodiments, in a fifth embodiment, the communication method further includes: receiving, by the terminal, beam quantity information sent by the network device, where the beam quantity information is used to indicate a quantity of beams to be measured by the terminal.

In this implementation, after measuring, based on the beam quantity information, a signal that meets the quantity of beams that is indicated in the beam quantity information, the terminal may stop performing signal measurement, thereby helping avoid wasting power consumption of the terminal.

With reference to any one of the first aspect or the foregoing embodiments, in a sixth embodiment, the measurement result includes at least one piece of beam identification information and at least one piece of signal quality information in the cell, and the at least one piece of beam identification information is in a one-to-one correspondence with the at least one piece of signal quality information.

According to a second aspect, this application provides a communication method. The communication method includes: receiving, by a network device, a measurement result obtained by a terminal by performing signal measurement based on a beam sweeping manner of a cell; and processing, by the network device, the measurement result.

In the communication method, the network device may process the measurement result obtained by the terminal by performing signal measurement based on the beam sweeping manner of the cell, thereby helping avoid wasting power consumption of the terminal.

With reference to the second aspect, in a first embodiment, the measurement result is obtained by the terminal by performing measurement in a target measurement time period in logging duration, the target measurement time period is all or a part of a time period that is in the logging duration and that overlaps with a beam sweeping time period of the first beam, and the beam sweeping time period of the first beam is determined by the terminal based on the beam sweeping manner.

With reference to the first embodiment, in a second embodiment, a length of the logging duration is greater than or equal to a length of a beam sweeping cycle of the first beam.

With reference to the first embodiment, in a third embodiment, a start moment of the logging duration is equal to a start moment of the beam sweeping time period of the first beam.

With reference to any one of the first to the third embodiments, in a fourth embodiment, the logging duration is N times a DRX cycle, the target measurement time period includes all or a part of a time period that is in a DRX ON time period of the terminal in the DRX cycle and that overlaps with the beam sweeping time period of the first beam, and N is a positive integer.

With reference to any one of the second aspect or the foregoing embodiments, in a fifth embodiment, the communication method further includes: sending, by the network device, beam quantity information to the terminal, where the beam quantity information is used to indicate a quantity of beams to be measured by the terminal.

With reference to any one of the second aspect or the foregoing embodiments, in a sixth embodiment, the measurement result includes at least one piece of beam identification information and at least one piece of signal quality information in the cell, and the at least one piece of beam identification information is in a one-to-one correspondence with the at least one piece of signal quality information.

According to a third aspect, this application provides a terminal. The terminal includes a module that is configured to perform the communication method in any one of the first aspect or the embodiments of the first aspect.

According to a fourth aspect, this application provides a network device. The network device includes a module that is configured to perform the communication method in any one of the second aspect or the embodiments of the second aspect.

According to a fifth aspect, this application provides a terminal. The terminal includes a processor and a transmitter. The processor is configured to execute a program. When the processor executes code, the processor and the transmitter implement the communication method in any one of the first aspect or the embodiments of the first aspect.

In one embodiment, the terminal may further include a memory, and the memory is configured to store the code executed by the processor.

In one embodiment, the terminal may further include a receiver. The receiver is configured to receive information sent by a network device.

According to a sixth aspect, this application provides a network device. The network device includes a processor and a receiver. The processor is configured to execute a program. When the processor executes code, the processor and the receiver implement the communication method in any one of the second aspect or the embodiments of the second aspect.

In one embodiment, the network device may further include a memory, and the memory is configured to store the code executed by the processor.

In one embodiment, the network device may further include a transmitter. The transmitter is configured to send information to the terminal.

According to a seventh aspect, this application provides a computer-readable storage medium. The computer-readable storage medium stores program code for being executed by a terminal. The program code includes an instruction that is used to perform the communication method in any one of the first aspect or the embodiments of the first aspect.

According to an eighth aspect, this application provides a computer-readable storage medium. The computer-readable storage medium stores program code for being executed by a network device. The program code includes an instruction that is used to perform the communication method in any one of the second aspect or the embodiments of the second aspect.

According to a ninth aspect, this application provides a computer program product including an instruction. When the computer program product runs on a terminal, the terminal performs the communication method in any one of the first aspect or the embodiments of the first aspect.

According to a tenth aspect, this application provides a computer program product including an instruction. When the computer program product runs on a network device, the network device performs the communication method in any one of the second aspect or the embodiments of the second aspect.

DESCRIPTION OF EMBODIMENTS

The following describes technical solutions of this application with reference to accompanying drawings.

Figure 1:
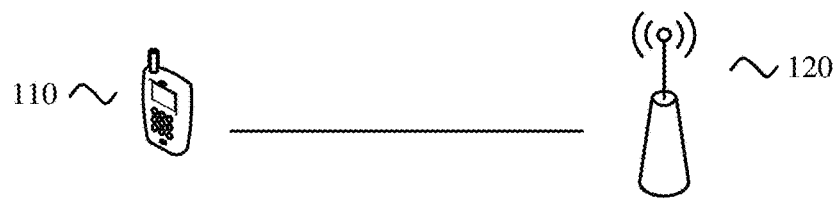
FIG. 1 is a schematic architectural diagram of a communications system to which a communication method according to an embodiment of this application can be applied.

FIG. 1 is a schematic architectural diagram of a communications system to which a communication method in an embodiment of this application can be applied. It should be understood that the embodiment of this application is not limited to a system architecture shown in FIG. 1. In addition, an apparatus in FIG. 1 may be hardware, or may be software divided based on functions, or a combination thereof.

The communications system shown in FIG. 1 includes one or more terminals 110 and one or more network devices 120. The terminal 110 and the network device 120 may communicate with each other. Specifically, the network device 120 may communicate with the terminal 110 in a beam sweeping manner.

The terminal 110 may be user equipment (UE). The UE may communicate with one or more core networks (CN) by using a radio access network (RAN). The UE may be referred to as an access terminal, a terminal device, a subscriber unit, a subscriber station, a mobile station, a mobile console, a remote station, a remote terminal, a mobile device, a user terminal, a radio network device, a user agent or a user apparatus. The UE may be a cellular phone, a cordless phone, a session initiation protocol (SIP) phone, a wireless local loop (WLL) station, a personal digital assistant (PDA), a handheld device having a wireless communication function, a computing device, another device connected to a wireless modem, a vehicle-mounted device, a wearable device, or a terminal device in Internet of Things and vehicle network, any form of terminal device in a future network, and the like.

An example of the network device 120 is a base station. It should be understood that a specific type of base station is not limited in this embodiment of this application. In systems using different radio access technologies, names of devices having functions of the base station may vary. For ease of description, in all the embodiments of this application, all the foregoing apparatuses that provide a wireless communication function for the terminal are collectively referred to as a base station.

The base station (BS) may also be referred to as a base station device, is a device that connects a terminal to a wireless network, and includes but is not limited to a transmission reception point (TRP), a NodeB in 5G (gNB), an evolved NodeB (eNB), a radio network controller (RNC), a NodeB (NB), a base station controller (BSC), a base transceiver station (BTS), a home eNodeB (for example, a home evolved NodeB, or a home NodeB, HNB), a baseband unit (BBU), a WiFi access point (AP), a pico base station device, and the like.

In the communications system shown in FIG. 1, the terminal 110 may perform signal measurement. For example, the terminal 110 may measure a signal of a serving cell, and report a measurement result to the network device 120, so that a network management device detects a problem and a fault in a network based on the measurement result, and/or optimizes network performance.

Currently, a communication method of a terminal mainly includes the following operations. A network device sends measurement configuration information to a terminal, where the measurement configuration information may include at least one type of information such as a logging cycle (for example, logging duration) and logging duration (for example, a logging interval). The terminal performs measurement based on the measurement configuration information, and reports the measurement result. The network device receives the measurement result, and then may perform an operation such as fault detection or network optimization based on the measurement result; or the network device may send the measurement result to the network management device, and the network management device performs an operation such as fault detection or network optimization based on the measurement result.

The logging duration may also be referred to as a logging interval.

The foregoing communication method has the following disadvantages: Within the logging duration indicated by the network device by using the measurement configuration information, the terminal may not detect a signal, not to mention measurement of a signal. In this case, if the terminal keeps performing a signal measurement procedure, power consumption of the terminal is wasted.

Therefore, a new communication method is provided in this application, so that power consumption of the terminal can be reduced.

Figure 2:
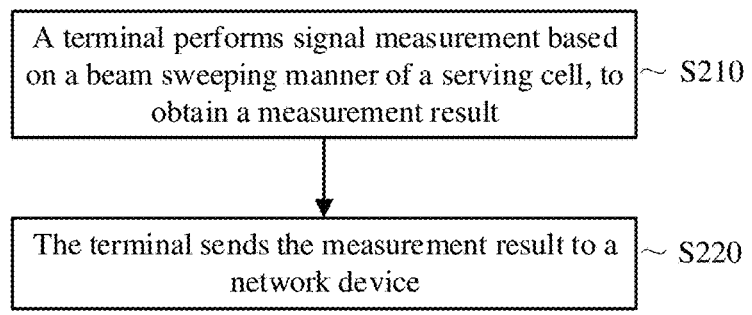
FIG. 2 is a schematic flowchart of a communication method according to an embodiment of this application.

FIG. 2 is a schematic flowchart of a communication method according to an embodiment of this application. It should be understood that FIG. 2 shows operations of the communication method, but these operations are merely examples. In this embodiment of this application, other operations or variations of the operations in FIG. 2 may further be performed.

S210. A terminal performs signal measurement based on a beam sweeping manner of a cell, to obtain a measurement result, where the cell may be a serving cell of the terminal.

The beam sweeping manner may be sent by a network device of the cell by using a broadcast message or dedicated RRC signaling, for example, may be sent by using RRC measurement configuration signaling. Alternatively, the terminal may further send a request message to the network device of the cell, to request the beam sweeping manner of the cell, and receive the beam sweeping manner sent by the network device of the cell based on the request message.

The beam sweeping manner may include a mapping relationship between each piece of beam identification information and a corresponding sweeping time, and/or a beam sweeping cycle. The beam identification information is used to uniquely identify a beam, and includes at least one of a beam identifier, an antenna port identifier of the beam, a reference signal of the beam, and an index of the beam.

The beam in this embodiment of this application may be referred to as a beam in English.

For example, a transmit beam may be signal strength distribution formed in different directions in space after a signal is transmitted by an antenna, and a receive beam may be signal strength distribution in different directions in space of a radio signal received from an antenna. It may be understood that one or more antenna ports of a beam may also be considered as an antenna port set, in other words, an antenna port set includes at least one antenna port.

Specifically, the beam may be a precoding vector that has a specific energy transmission directivity, and the precoding vector can identified by using index information, and the energy transmission directivity is that relatively good received power is used to receive, in a specific space location, a signal on which precoding processing is performed by using the precoding vector, for example, the received power meets a signal-to-noise ratio during receiving and demodulation; and relatively low power is used to receive, in another space location, a signal on which precoding processing is performed by using the precoding vector, and does not meet the signal-to-noise ratio during receiving and demodulation. Different communications devices may have different precoding vectors. In other words, the different communications devices are corresponding to different beams. For a configuration or a capability of a communications device, the communications device may simultaneously use one or more of a plurality of different precoding vectors. In other words, the communications device may form one or more beams at the same time. The beam may be understood as a space resource. The beam may be marked by using a beam identifier. The beam identifier may be correspondingly configured as a corresponding resource ID of a user. For example, the beam identifier may be correspondingly a configured ID or resource of a channel state information-reference signal (CSI-RS), or may be a configured ID or resource of an uplink sounding reference signal (SRS), or may be index information explicitly or implicitly carried in a specific signal or channel carried by using the beam. The index information includes but is not limited to a beam identifier of the beam indicated by a synchronization signal or a broadcast channel sent by using the beam.

S220. The terminal sends the measurement result to the network device.

In the communication method, the terminal performs signal measurement with reference to the beam sweeping manner of the cell. To be specific, the terminal may perform signal measurement with reference to a beam sweeping time. More specifically, the terminal may learn a sweeping time of each beam. This helps the terminal avoid signal measurement when the terminal cannot detect a signal, and further helps save power consumption of the terminal.

That the terminal performs measurement based on the beam sweeping manner of the serving cell may include: The terminal performs measurement based on the beam sweeping time period in the cell.

Usually, in each cell, reference signals of different beams, such as a synchronization signal (SS) and a channel state information reference signal (CSI-RS), may have same or different sweeping duration, but may have different sweeping time periods.

For example, the beam sweeping manner includes a correspondence between a reference signal of each sequentially swept beam in the cell and a time, and sweeping duration of a reference signal of each beam is 5 ms. If the terminal detects a reference signal of a first beam at the first ms, the terminal may determine that a sweeping time period of the reference signal of the first beam is the first ms to the fifth ms, and a sweeping time period of a reference signal of a second beam is the sixth ms to the tenth ms. By analogy, sweeping time periods of reference signals of all beams can be determined. In this embodiment of this application, the sweeping time period of the reference signal of the beam may be referred to as a beam sweeping time period of the beam.

After determining the beam sweeping time period of each beam, in some embodiments, the terminal may perform signal measurement in the beam sweeping time period of each beam, to avoid power consumption caused by measurement performed by the terminal when the terminal cannot detect a signal.

In some embodiments, the terminal may receive the logging duration sent by the network device. The logging duration may be duration of signal measurement performed by the terminal each time. The logging duration may be received by the terminal in a current serving cell, or may be received by the terminal in a neighboring cell.

It should be noted that the logging duration is configured by the network device. To be specific, the network device instructs the terminal to perform signal measurement and recording within the logging duration.

In the prior art, after receiving the logging duration, the terminal may keep performing signal measurement within the logging duration. However, in this embodiment of this application, after receiving the logging duration, the terminal may perform signal measurement based on the logging duration and the beam sweeping manner, that is, the beam sweeping time period of the beam.

Specifically, that the terminal performs signal measurement based on the beam sweeping time period of a beam (the beam is referred to as a first beam for ease of subsequent description) and the logging duration may include: The terminal may determine the beam sweeping time period of the first beam in the cell based on the beam sweeping manner of the cell; and then determine, based on the configured logging duration and the beam sweeping time period of the first beam, all or a part of a time period that is in the logging duration and that overlaps with the beam sweeping time period as a target measurement time period; and then the terminal performs signal measurement in the target measurement time period to obtain the measurement result.

When there are a plurality of beams in the cell, the terminal may determine the beam sweeping time period of each beam based on the beam sweeping manner, and may determine all or a part of a time period that is in each beam sweeping time period and that overlaps with the logging duration as a total target measurement time period, and then perform signal measurement in the target measurement time period to obtain the measurement result.

The following uses the first beam as an example to describe in detail how the terminal performs signal measurement based on the logging duration and the beam sweeping manner.

The terminal may determine the beam sweeping time period of the first beam in the cell based on the beam sweeping manner. For example, the terminal may determine, based on a fact that the beam sweeping duration of the first beam is 5 ms and the terminal detects a reference signal of the first beam at the first ms, that the beam sweeping time period of the first beam is the first ms to the fifth ms.

If the logging duration is 10 ms, and a start moment of the logging duration is the second ms, the terminal may determine, as the target measurement time period, all or a part of the four ms, namely, the second ms to the fifth ms, that is in the logging duration and that overlaps with the beam sweeping time period of the first beam.

In this case, the terminal may perform signal measurement within the four ms in which a signal can be detected in the logging duration, and stop signal measurement within another six ms in the logging duration, thereby saving power of the terminal.

Figure 3:
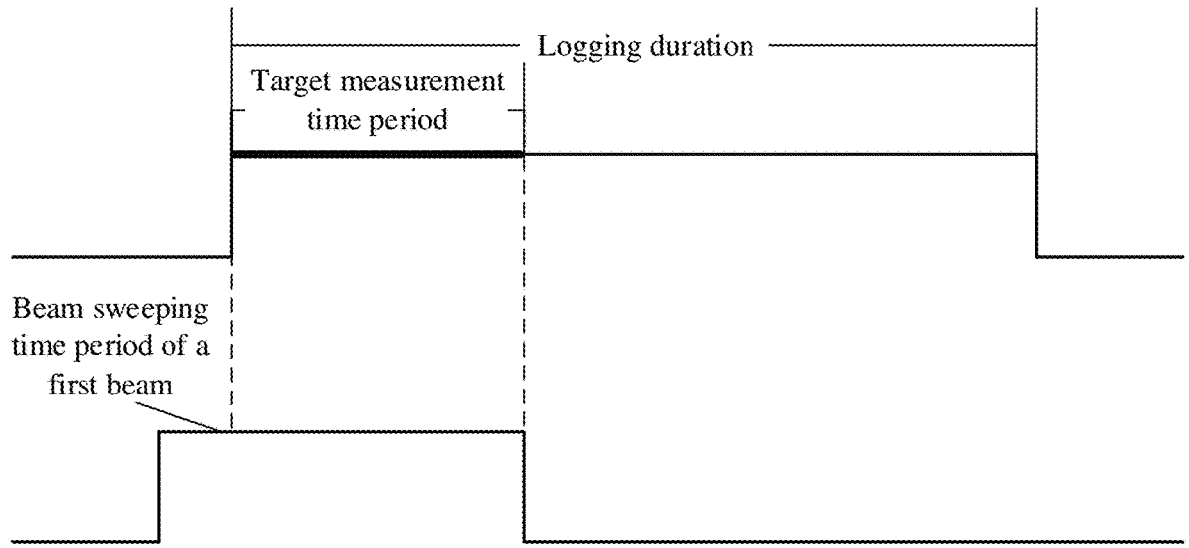
FIG. 3 is a schematic diagram of a target measurement time period according to an embodiment of this application.

As shown in FIG. 3, in the logging duration, a thick solid line indicates the target measurement time period in which the terminal may perform signal measurement in a first beam direction.

In this method, the terminal may perform signal measurement only in a time period that is in logging duration and that overlaps with the beam sweeping time period, thereby saving power consumption of the terminal.

In one embodiment, a length of the logging duration may be greater than or equal to a length of the beam sweeping cycle, so that the logging duration has a time period overlapping with the beam sweeping time period of the first beam, to help ensure that the terminal can perform signal measurement in a time period in which a signal is detected.

For example, the serving cell of the terminal includes eight sequentially swept beams, and beam sweeping duration of each beam is 5 ms, the beam sweeping cycle is 40 ms, and the length of the logging duration may be greater than or equal to 40 ms, so that the logging duration may have a part overlapping with a beam sweeping time period of any beam. In this way, regardless of which beam sweeping area of a beam the terminal is located in, the terminal can measure a signal that can be detected by the terminal.

Alternatively, after determining the beam sweeping time period of the signal, the terminal may adjust the start moment of the logging duration based on the beam sweeping time period, so that the beam sweeping time period has a part overlapping with the logging duration. In this way, the terminal can measure the signal in a time period in which the signal is detected.

More specifically, the terminal may adjust the start moment of the logging duration to the start moment of the beam sweeping time period of the first beam, to ensure that the logging duration has a part overlapping with the beam sweeping time period of the first beam.

Figure 4:
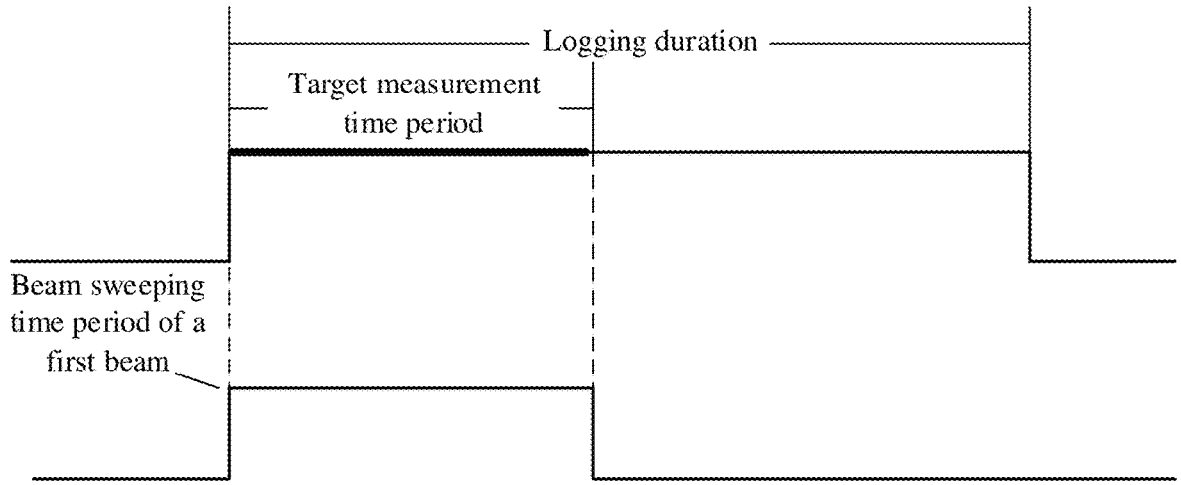
FIG. 4 is a schematic diagram of a target measurement time period according to another embodiment of this application.

As shown in FIG. 4, the start moment of the logging duration is the same as the start moment of the beam sweeping time period of the first beam, so that the logging duration has a part overlapping with the beam sweeping time period of the first beam.

In one embodiment, in a communication process of the terminal and the network device, the terminal may perform discontinuous reception (DRX). For example, the terminal may not receive data in some time, after waking up, the terminal only maintains an awake mode in some time to receive the data, to save power consumption of the terminal. A time period in which the UE stays awake after waking up may be referred to as a receiving time period for discontinuous transmission, namely, a DRX ON time period.

It may be understood that if the DRX is configured for the terminal, that the terminal determines, as the target measurement time period based on the beam sweeping time period of the first beam and the logging duration, all or a part of a time period that is in the logging duration and that overlaps with the beam sweeping time period of the first beam may include: The terminal determines, as the target measurement time period based on the beam sweeping time period of the first beam, the logging duration, and a receiving DRX ON time period in a DRX cycle, all or a part of a time period that is in the DRX ON time period and that overlaps with the beam sweeping time period of the first beam. In this way, the terminal may perform signal measurement only when transmitting data, thereby further reducing power consumption of the terminal.

In one embodiment, the logging duration may be an integer multiple of the DRX cycle, and correspondingly, the DRX ON time period may be an integer multiple of the beam sweeping cycle.

Figure 5:
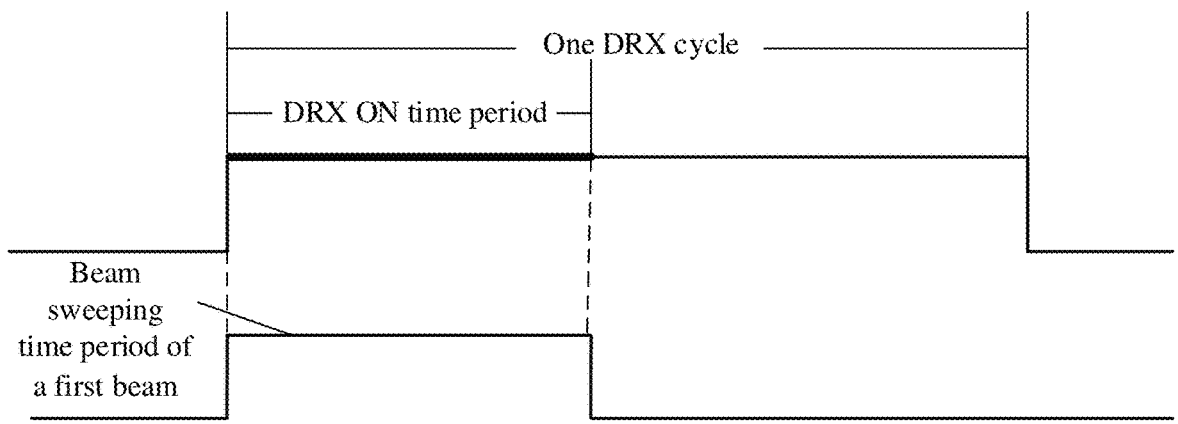
FIG. 5 is a schematic diagram of a target measurement time period according to another embodiment of this application.

As shown in FIG. 5, it may be considered that the logging duration is the same as the DRX cycle. In other words, the logging duration is a DRX cycle. In this case, that the terminal determines the target measurement time period based on the beam sweeping time period of the first beam and the logging duration may include: The terminal determines the target measurement time period based on the DRX cycle (that is, the logging duration), the DRX ON time period, and the beam sweeping time period of the first beam.

Specifically, the terminal may determine, as the target measurement time period of the first beam, all or a part of the time period that is in the DRX ON time period and that overlaps with the beam sweeping time period of the first beam.

In one embodiment, when the logging duration is an integer multiple of the DRX cycle, information used to indicate the logging duration may specifically indicate a multiple relationship between the logging duration and the DRX cycle. For example, when the logging duration is 1 time the DRX, information used to indicate the logging duration may indicate 1.

In this way, after receiving the information used to indicate the logging duration, the terminal may determine the logging duration based on the DRX cycle.

The reference signal of the first beam may be a common reference signal of the serving cell, such as a synchronization signal SS, or may be another signal, such as a CSI-RS, a CRS, or a reference signal of a terminal level.

In one embodiment, the terminal may receive beam quantity information from the network device, and the beam quantity information indicates a quantity of beams that can be measured by the terminal. After receiving the beam quantity information, in a normal case, the terminal may perform signal measurement in a direction with a corresponding quantity of beams. After a measured quantity of beams reaches the quantity indicated in the beam quantity information, the terminal may stop signal measurement.

In one embodiment, the terminal may receive measurement configuration information from the network device, and the measurement configuration information may include at least one of the following: logging area information, such as identifiers or indexes of one or more to-be-measured cells; one or more pieces of network notification area (RNA) information, where the RAN is an abbreviation of a radio access network; one or more pieces of tracking area (TA) information; and one or more pieces of public land mobile network (PLMN) information.

It should be noted that the foregoing information used to indicate the logging duration may be carried in the measurement configuration information.

In this embodiment of this application, the terminal may obtain the beam sweeping manner of a current cell in the current cell, or may obtain the beam sweeping manner of a current cell in a neighboring cell.

For example, after the terminal moves from a first cell to a second cell, if the second cell belongs to a range of a to-be-measured cell, the terminal may obtain the beam sweeping manner of the second cell from a system message of the second cell, or the terminal may send a request message to the network device of the second cell, to request the beam sweeping manner of the second cell, and receive the beam sweeping manner sent by the network device of the second cell based on the request message.

In this embodiment of this application, the measurement result sent by the terminal may include the beam identification information, or the beam identification information and corresponding beam signal quality information.

In one embodiment, the terminal may further send, to the network device, a cell identifier of a cell corresponding to the beam identifier.

In one embodiment, the terminal may further send information such as a measurement time and a measurement location to the network device.

In one embodiment, the terminal may send a measurement report in a plurality of manners. For example, after a terminal in a connected mode performs signal measurement to obtain the measurement result, the terminal may immediately send the measurement report including the measurement result to the network device by using radio resource control (RRC) signaling. The connected mode may also be referred to as an active mode (active).

Alternatively, the terminal in the connected mode may first send, to the network device, indication information indicating that the measurement report exists, such as MDT report indicator information, and then the terminal sends the measurement report.

For another example, after a terminal in an idle mode or an inactive RRC_INACTIVE mode performs signal measurement and obtains the measurement result, the terminal may send the measurement report to the network device by using a contention-based data transmission resource or by using a grant-free resource.

Alternatively, the terminal in the idle mode or the inactive mode may first cache the measurement report. When the terminal sends an RRC message, for example, the terminal initiates a connection establishment complete message, or the terminal sends a reconstruction complete message, or the terminal sends a reconfiguration complete message, or the terminal sends a connection restoration complete message, or the terminal sends a connection reactivation complete message, the terminal may carry, in the foregoing RRC message, the indication information indicating that the measurement report exists, such as the MDT report indicator information. Then the terminal may receive a measurement report request message sent by the network device based on the indication information, and send the measurement report based on the measurement report request message.

In addition, the terminal may further receive a logging cycle sent by the network device. The logging cycle may refer to configured total duration of signal measurement performed by the terminal. When the total measurement duration of the terminal reaches or exceeds the logging cycle, the terminal may stop the measurement.

The logging duration is a part of the logging cycle. For example, the logging cycle may be 50 ms, and the logging duration may be 10 ms. To be specific, the terminal may perform signal measurement for total duration of 50 ms. The 50 ms may be divided to perform measurement five times, and each measurement requires 10 ms.

Figure 6:
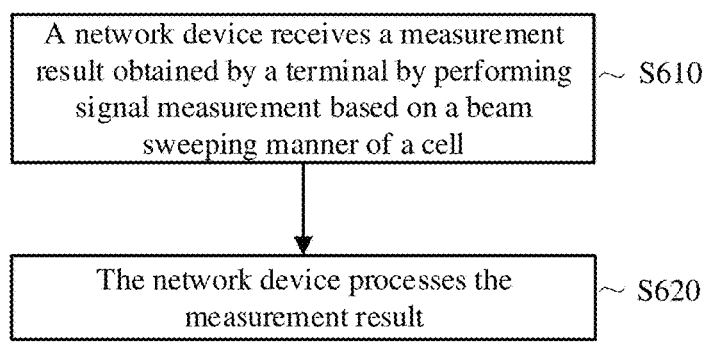
FIG. 6 is a schematic flowchart of a communication method according to another embodiment of this application.

FIG. 6 is a schematic flowchart of a communication method according to another embodiment of this application. It should be understood that FIG. 6 shows operations of the communication method, but these operations are merely examples. In this embodiment of this application, other operations or variations of the operations in FIG. 6 may further be performed.

S610. A network device receives a measurement result obtained by a terminal by performing signal measurement based on a beam sweeping manner of a cell.

Specifically, the measurement result may include beam identification information, or beam identification information and corresponding signal quality information.

In one embodiment, the network device may further receive a cell identifier of a cell corresponding to a beam identifier.

In one embodiment, the terminal may further send information such as a measurement time and a measurement location to the network device.

S620. The network device processes the measurement result.

In the communication method, the network device may receive a measurement report including the measurement result obtained by the terminal by performing signal measurement based on the beam sweeping manner, and perform processing based on the measurement report. This helps save power consumption of the terminal.

That the network device processes the measurement report may include: The network device detects a network fault, repairs a network problem, optimize network performance, and the like based on the measurement result. Alternatively, the network device may send the measurement result to a network management device, and the network management device detects a network fault, repairs a network problem, optimizes network performance, and the like based on the measurement result.

The network device in this embodiment of this application may be the network device in the communication method shown in FIG. 2, and may implement a function that can be implemented by the network device in the communication method shown in FIG. 2. A related technical feature in the communication method shown in FIG. 2 is also applicable to the communication method in this embodiment of this application. For brevity, details are not described herein again.

Figure 7:
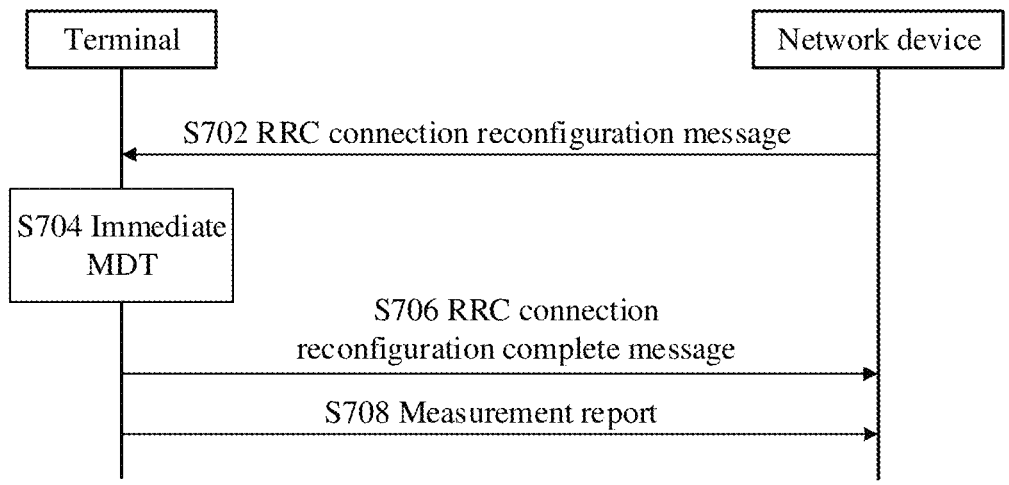
FIG. 7 is a schematic interaction flowchart of a communication method according to an embodiment of this application.

The following describes in detail the communication method in this application with reference to an immediate MDT method shown in FIG. 7. It should be understood that FIG. 7 shows operations of the communication method, but these operations are merely examples. In this embodiment of this application, other operations or variations of the operations in FIG. 7 may further be performed.

S702. The network device sends measurement configuration information to the terminal by using an RRC connection reconfiguration message. Correspondingly, the terminal receives the measurement configuration information.

Before the network device sends the measurement configuration information to the terminal, the network device or the network management device may first determine specific terminals that perform signal measurement. In other words, the network device or the network management device may first determine specific measurement terminals.

Specifically, the network device or the network management device may sequentially select a subsequently accessed terminal as a measurement terminal from the beginning of a session until a quantity of selected measurement terminals reaches a specified specification. The subsequently accessed terminal includes a terminal that performs accessing by using normal RRC connection setup, handover, and re-setup.

After determining the measurement terminals, the network device may send the measurement configuration information to these measurement terminals by using the RRC connection reconfiguration message, and the measurement configuration information may also be referred to as a configuration parameter.

The configuration parameter may include at least one of the following: a measurement object such as reported frequency information and/or a quality type, where the quality type may include reference signal received power (RSRP), reference signal received quality (RSRQ) of a beam, or another quality type; logging duration; a logging cycle such as duration of a T330 timer; network absolute time information; a trace reference parameter; a trace recording session reference; a trace collection server identity (TCE Id, Trace Collection Entity ID); an MDT PLMN list; and logging area information.

The logging area information is used to indicate measurement range information of the terminal. For specific measurement range information, refer to descriptions in another embodiment of the present invention.

The logging area information in the MDT PLMN list may be cross-RNA or cross-PLMN. When the logging area information is not configured, the measurement result recorded by the terminal may cover all RNAs or all PLMNs in the MDT PLMN list.

The RRC connection reconfiguration message may further include includeLocationInfo, and the includeLocationInfo is used to activate the terminal to perform immediate MDT.

The network device may further send the beam sweeping manner of a serving cell to the terminal. In some embodiments, the network device may further send the beam sweeping manner of a neighboring cell to the terminal.

S704. After the terminal receives the RRC connection reconfiguration message, if the RRC connection reconfiguration message includes the includeLocationInfo that is used to activate the terminal to perform immediate MDT, the terminal may start to perform immediate MDT.

Specifically, the terminal may further determine the beam sweeping manner, and then perform signal measurement based on the beam sweeping manner and the measurement configuration information in the RRC connection reconfiguration message, that is, the immediate MDT, and record the measurement result.

For an implementation in which the terminal performs immediate MDT based on the beam sweeping manner, refer to S210 in FIG. 2. For brevity, details are not described herein again.

S706. After completing execution of the immediate MDT, the terminal may send an RRC connection reconfiguration complete (RRC) message to the network device.

The RRC connection reconfiguration complete message may include the includeLocationInfo. Specifically, the includeLocationInfo may include 1-bit indication information. If a value of the indication information is TRUE, it indicates that the immediate MDT measurement item configuration of the terminal is completed.

S708. The terminal sends the measurement report to the network device, where the measurement report carries the measurement result recorded in S704, and the measurement report may further carry information about LocationCoordinates, to associate the measurement report with the location information of the terminal.

Correspondingly, the network device receives the measurement report. Then, the network device may detect a network fault, optimize network performance, and the like based on the measurement result and other information in the measurement report.

Figure 8:
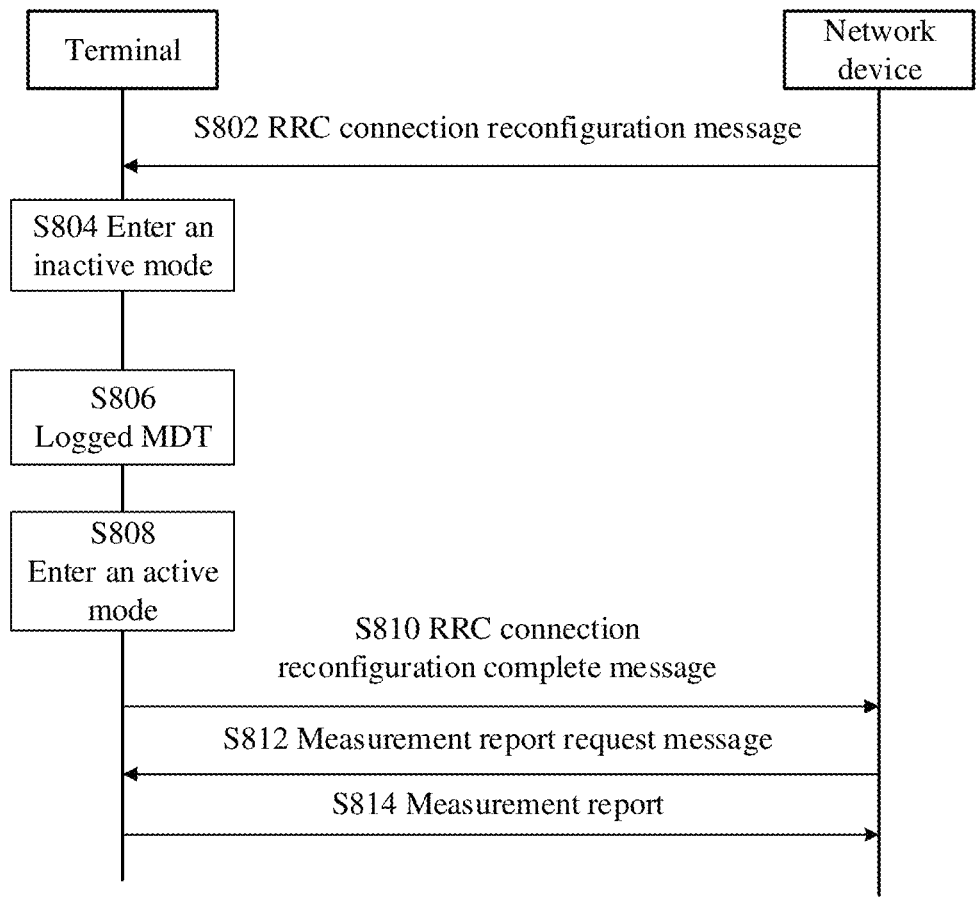
FIG. 8 is a schematic interaction flowchart of a communication method according to another embodiment of this application.

The following describes in detail the communication method in this application with reference to a logged MDT method shown in FIG. 8. It should be understood that FIG. 8 shows operations of the communication method, but these operations are merely examples. In this embodiment of this application, other operations or variations of the operations in FIG. 8 may further be performed.

S802. The network device sends the measurement configuration information to the terminal by using the RRC connection reconfiguration message. Correspondingly, the terminal receives the measurement configuration information.

Before the network device sends the measurement configuration information to the terminal, the network device or the network management device may first determine specific terminals that perform signal measurement, in other words, determine specific measurement terminals.

The network device or the network management device may successively select, from the beginning of a session, a subsequently accessed terminal with a logged MDT capability as a measurement terminal until session duration ends or a session termination command is received. A quantity of terminals that perform logged MDT may not be limited.

After determining the measurement terminals, the network device may send the measurement configuration information to these measurement terminals by using the RRC connection reconfiguration message, and the measurement configuration information may also be referred to as a configuration parameter.

The configuration parameter may include at least one of the following: a measurement object such as reported frequency information and/or a quality type, where the quality type may include reference signal received power (RSRP), reference signal received quality (RSRQ) of a beam, or another quality type; logging duration; a logging cycle such as duration of a T330 timer; network absolute time information; a trace reference number parameter (trace reference parameter); a trace recording session reference number; a trace collection server identity (TCE Id, Trace Collection Entity ID); an MDT PLMN list; and logging area information.

If the configuration parameter includes the logging area information, the terminal may measure only a signal in a logging area when performing logged MDT. The logging area information is used to indicate measurement range information of the terminal. For specific measurement range information, refer to descriptions in another embodiment of the present invention.

The logging area information in the MDT PLMN list may be cross-RNA or cross-PLMN. When the logging area information is not configured, the measurement result recorded by the terminal may cover all RNAs or all PLMNs in the MDT PLMN list.

The network device may further send the beam sweeping manner of a serving cell to the terminal. In some embodiments, the network device may further send the beam sweeping manner of a neighboring cell to the terminal.

S804. The terminal enters an inactive mode or an idle mode, where the inactive mode is also referred to as a third mode.

S806. The terminal performs logged MDT in the inactive mode or the idle mode.

Specifically, the terminal may further determine the beam sweeping manner, and then perform signal measurement, that is, the logged MDT, based on the beam sweeping manner and the measurement configuration information in the RRC connection reconfiguration message, and record the measurement result.

For an implementation in which the terminal performs logged MDT based on the beam sweeping manner, refer to S210 in FIG. 2. For brevity, details are not described herein again.

After performing the logged MDT in the inactive mode or the idle mode, the terminal first caches the measurement result, or caches the measurement report including the measurement result.

S808. The terminal enters a connected mode.

S810. The terminal may send the RRC connection reconfiguration complete message to the network device, where the RRC connection reconfiguration complete message may include the includeLocationInfo, specifically, the includeLocationInfo may include 1-bit indication information, and if a value of the indication information is TRUE, it indicates that the immediate MDT measurement item configuration of the terminal is completed.

S812. The network device sends a measurement report request message to the terminal to request the measurement report.

S814. The terminal sends the measurement report to the network device, where the measurement report carries the measurement result recorded in S706, and the measurement report may further carry information about LocationCoordinates, to associate the measurement report with the location information of the terminal.

Figure 9:
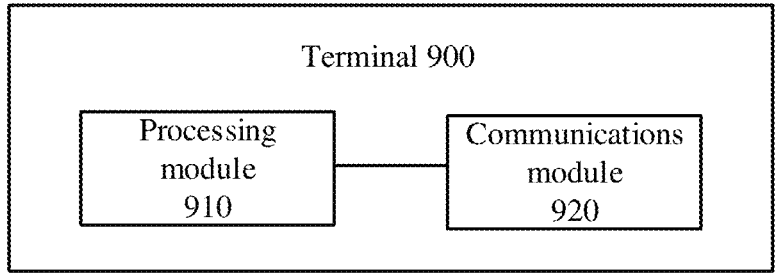
FIG. 9 is a schematic structural diagram of a terminal according to an embodiment of this application.

FIG. 9 is a schematic structural diagram of a terminal according to an embodiment of this application. It should be understood that a terminal 900 shown in FIG. 9 is merely an example. The terminal in this embodiment of this application may further include another module or unit, or include a module with a function similar to that of each module in FIG. 9, or may not necessarily include all modules in FIG. 9. The terminal 900 includes:

a processing module 910, configured to perform signal measurement based on a beam sweeping manner of a cell, to obtain a measurement result; and a communications module 920, configured to send the measurement result to a network device.

The terminal performs signal measurement based on the beam sweeping manner of the cell, so that the terminal can perform signal measurement in a beam sweeping time period of a signal, thereby helping avoid wasting power consumption of the terminal.

In some embodiments, the processing module 910 is specifically configured to: determine a beam sweeping time period of a first beam in the cell based on the beam sweeping manner of the cell; determine, as a target measurement time period based on the beam sweeping time period of the first beam and logging duration, all or a part of a time period that is in the logging duration and that overlaps with the beam sweeping time period of the first beam; and perform signal measurement in the target measurement time period to obtain the measurement result.

In some embodiments, a length of the logging duration is greater than or equal to a length of a beam sweeping cycle of the first beam.

In some embodiments, a start moment of the logging duration is equal to a start moment of the beam sweeping time period.

In some embodiments, the logging duration is N times a DRX cycle, and N is a positive number. Correspondingly, the processing module 910 is specifically configured to: determine, as the target measurement time period based on the beam sweeping time period of the first beam, the DRX cycle, and a DRX ON time period of the DRX cycle, all or a part of a time period that is in the DRX ON time period and that overlaps with the beam sweeping time period of the first beam.

In some embodiments, the communications module 920 is further configured to receive beam quantity information sent by the network device, where the beam quantity information is used to indicate a quantity of beams to be measured by the terminal.

In some embodiments, the measurement result includes at least one piece of beam identification information and at least one piece of signal quality information in the cell, and the at least one piece of beam identification information is in a one-to-one correspondence with the at least one piece of signal quality information.

The terminal shown in FIG. 9 may perform operations performed by the terminal in the communication method shown in FIG. 2. For brevity, details are not described herein again.

Figure 10:
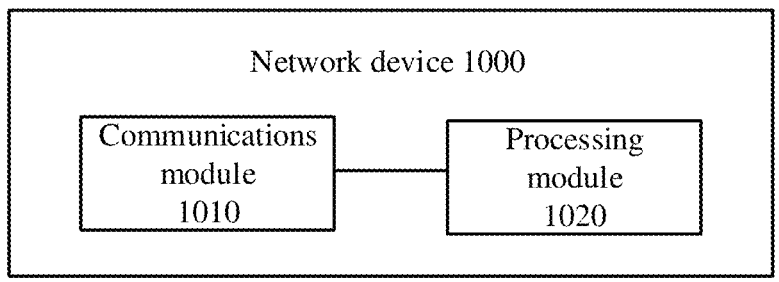
FIG. 10 is a schematic structural diagram of a network device according to an embodiment of this application.

FIG. 10 is a schematic structural diagram of a network device according to an embodiment of this application. It should be understood that a network device 1000 shown in FIG. 10 is merely an example. The network device in this embodiment of this application may further include another module or unit, or include a module with a function similar to that of each module in FIG. 10, or may not necessarily include all modules in FIG. 10. The network device 1000 includes:

a communications module 1010, configured to receive a measurement result obtained by a terminal by performing signal measurement based on a beam sweeping manner of a cell; and a processing module 1020, configured to process the measurement result.

The network device may process the measurement result obtained by the terminal by performing signal measurement based on the beam sweeping manner of the cell, to help avoid wasting power consumption of the terminal.

In some embodiments, the measurement result is obtained by the terminal by performing measurement in a target measurement time period in logging duration, the target measurement time period is all or a part of a time period that is in the logging duration and that overlaps with a beam sweeping time period of a first beam, and the beam sweeping time period of the first beam is determined by the terminal based on the beam sweeping manner.

In some embodiments, a length of the logging duration is greater than or equal to a length of a beam sweeping cycle of the first beam.

In some embodiments, a start moment of the logging duration is equal to a start moment of the beam sweeping time period of the first beam.

In some embodiments, the logging duration is N times a DRX cycle, the target measurement time period includes all or a part of a time period that is in a DRX ON time period of the terminal in the DRX cycle and that overlaps with the beam sweeping time period of the first beam, and N is a positive integer.

In some embodiments, the communications module 1010 is further configured to send beam quantity information to the terminal, where the beam quantity information is used to indicate a quantity of beams to be measured by the terminal.

In some embodiments, the measurement result includes at least one piece of beam identification information and at least one piece of signal quality information in the cell, and the at least one piece of beam identification information is in a one-to-one correspondence with the at least one piece of signal quality information.

The network device shown in FIG. 10 may perform operations performed by the network device in the communication method shown in FIG. 6. For brevity, details are not described herein again.

Figure 11:
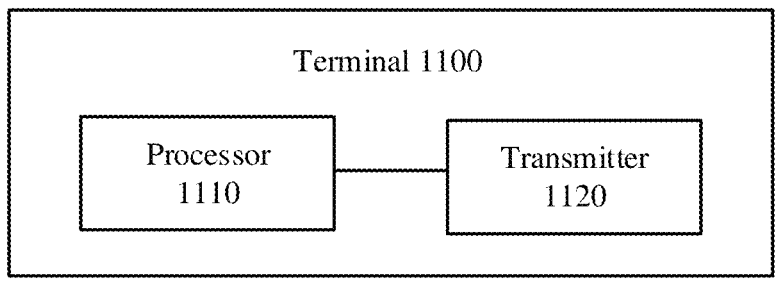
FIG. 11 is a schematic structural diagram of a terminal according to another embodiment of this application.

FIG. 11 is a schematic structural diagram of a terminal according to another embodiment of this application. It should be understood that a terminal 1100 shown in FIG. 11 is merely an example. The terminal in this embodiment of this application may further include another module or unit, or a module with a function similar to that of each module in FIG. 11.

A processor 1110 may be configured to implement an operation that can be implemented by the processing module 910 in FIG. 9, and a transmitter 1120 may be configured to implement an operation that can be implemented by the communications module 920 in FIG. 9.

The terminal shown in FIG. 11 may further include a receiver, configured to receive information sent by a network device. The receiver and the transmitter may be integrated into a transceiver.

The terminal shown in FIG. 11 may also include a memory, configured to store program code executed by the processor. The processor 1110 may be integrated with the memory.

Figure 12:
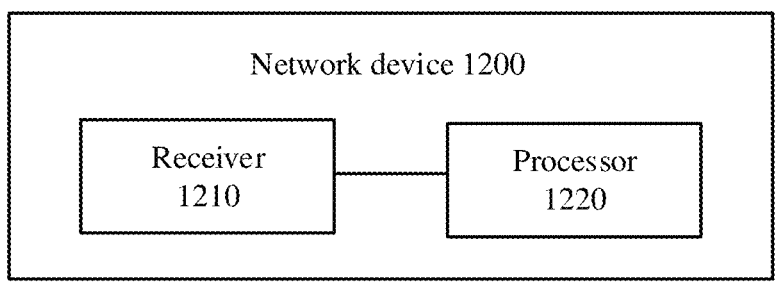
FIG. 12 is a schematic structural diagram of a network device according to another embodiment of this application.

FIG. 12 is a schematic structural diagram of a network device according to another embodiment of this application. It should be understood that a network device 1200 shown in FIG. 12 is merely an example. The network device in this embodiment of this application may further include another module or unit, or a module with a function similar to that of each module in FIG. 12.

A processor 1220 may be configured to implement an operation that can be implemented by the processing module 1020 in FIG. 10, and a receiver 1210 may be configured to implement an operation that can be implemented by the communications module 1010 in FIG. 10.

The network device shown in FIG. 12 may further include a transmitter, configured to send information to a terminal or another network device. The receiver and the transmitter may be integrated into a transceiver.

The network device shown in FIG. 12 may also include a memory, configured to store program code executed by the processor. The processor 1220 may be integrated with the memory.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in some embodiments. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by software, hardware, firmware, or any combination thereof. When software is used to implement the embodiments, the embodiments may be implemented all or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, by a terminal, a beam sweeping time period of a first beam in a cell based on a beam sweeping manner of the cell;
   determining, by the terminal as a target measurement time period based on the beam sweeping time period and a logging duration, all or a part of a time period that is in the logging duration and that overlaps with the beam sweeping time period; and
   performing, by the terminal, signal measurement in the target measurement time period to obtain a measurement result; and
   sending, by the terminal, the measurement result to a network device.

2. The communication method according to claim 1, wherein a length of the logging duration is greater than or equal to a length of a beam sweeping cycle of the first beam.

3. The communication method according to claim 1, wherein a start moment of the logging duration is equal to a start moment of the beam sweeping time period.

4. The communication method according to claim 1, wherein the logging duration is N times a discontinuous transmission (DRX) cycle, and N is a positive integer; and
   the determining, by the terminal as a target measurement time period based on the beam sweeping time period and logging duration, all or a part of a time period that is in the logging duration and that overlaps with the beam sweeping time period comprises:
   determining, by the terminal as the target measurement time period based on the beam sweeping time period, the DRX cycle, and a receive DRX ON time period in the DRX cycle, all or a part of a time period that is in the receive DRX ON time period and that overlaps with the beam sweeping time period.

5. The communication method according to claim 1, further comprising:
   receiving, by the network device, the measurement result obtained by the terminal by performing signal measurement based on the beam sweeping manner of the cell; and
   processing, by the network device, the measurement result.

6. The communication method according to claim 5, wherein the measurement result is obtained by the terminal by performing signal measurement in the target measurement time period in a logging duration, the target measurement time period is all or a part of a time period that is in the logging duration and that overlaps with a beam sweeping time period of a first beam, and the beam sweeping time period of the first beam is determined by the terminal based on the beam sweeping manner.

7. The communication method according to claim 6, wherein a length of the logging duration is greater than or equal to a length of a beam sweeping cycle of the first beam.

8. The communication method according to claim 6, wherein a start moment of the logging duration is equal to a start moment of the beam sweeping time period.

9. The communication method according to claim 6, wherein the logging duration is N times a discontinuous transmission (DRX) cycle, the target measurement time period comprises all or a part of a time period that is in a DRX ON time period of the terminal in the DRX cycle and that overlaps with the beam sweeping time period, and N is a positive integer.

10. A terminal, comprising:
    a processor; and
    a non-transitory computer-readable storage medium coupled to the processor and storing programming instructions for execution by the processor, the programming instructions instruct the processor to:
    determine a beam sweeping time period of a first beam in a cell based on a beam sweeping manner of the cell;
    determine, as a target measurement time period based on the beam sweeping time period and a logging duration, all or a part of a time period that is in the logging duration and that overlaps with the beam sweeping time period; and
    perform signal measurement in the target measurement time period to obtain the measurement result; and
    send the measurement result to a network device.

11. The terminal according to claim 10, wherein a length of the logging duration is greater than or equal to a length of a beam sweeping cycle of the first beam.

12. The terminal according to claim 10, wherein a start moment of the logging duration is equal to a start moment of the beam sweeping time period.

13. The terminal according to claim 10, wherein the logging duration is N times a discontinuous transmission DRX cycle, and N is a positive integer; and
    the programming instructions instruct the processor to determine, as the target measurement time period based on the beam sweeping time period, the DRX cycle, and a receive DRX ON time period in the DRX cycle, all or a part of a time period that is in the DRX ON time period and that overlaps with the beam sweeping time period.

14. A network device, comprising:
    a processor; and
    a non-transitory computer-readable storage medium coupled to the processor and storing programming instructions for execution by the processor, the programming instructions instruct the processor to:
    receive a measurement result obtained by a terminal by performing signal measurement based on a beam sweeping manner of a cell, wherein the measurement result is obtained by the terminal by performing signal measurement in a target measurement time period in a logging duration, the target measurement time period is all or a part of a time period that is in the logging duration and that overlaps with a beam sweeping time period of a first beam, and the beam sweeping time period of the first beam is determined by the terminal based on the beam sweeping manner; and
    process the measurement result.

15. The network device according to claim 14, wherein a length of the logging duration is greater than or equal to a length of a beam sweeping cycle of the first beam.

16. The network device according to claim 14, wherein a start moment of the logging duration is equal to a start moment of the beam sweeping time period.

17. The network device according to claim 14, wherein the logging duration is N times a discontinuous transmission (DRX) cycle, the target measurement time period comprises all or a part of a time period that is in a DRX ON time period of the terminal in the DRX cycle and that overlaps with the beam sweeping time period, and N is a positive integer.

* * * * *